(12) United States Patent
Graner et al.

(10) Patent No.: US 10,103,597 B2
(45) Date of Patent: Oct. 16, 2018

(54) LABYRINTH SEAL FOR THREE-PHASE MACHINES

(71) Applicant: Liebherr-Components Biberach GmbH, Biberach an der Riss (DE)

(72) Inventors: Klaus Graner, Biberach an der Riss (DE); Johann Lis, Riedlingen (DE); Marijo Mendes, Ulm (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 214 days.

(21) Appl. No.: 15/031,192

(22) PCT Filed: Oct. 17, 2014

(86) PCT No.: PCT/EP2014/002807
§ 371 (c)(1),
(2) Date: Apr. 21, 2016

(87) PCT Pub. No.: WO2015/058846
PCT Pub. Date: Apr. 30, 2015

(65) Prior Publication Data
US 2016/0241102 A1   Aug. 18, 2016

(30) Foreign Application Priority Data

Oct. 22, 2013 (DE) .................... 20 2013 009 385 U

(51) Int. Cl.
*H02K 5/124* (2006.01)
*F16J 15/447* (2006.01)
(Continued)

(52) U.S. Cl.
CPC ............. *H02K 5/124* (2013.01); *F16C 19/06* (2013.01); *F16C 33/303* (2013.01); *F16C 33/32* (2013.01);
(Continued)

(58) Field of Classification Search
CPC ............ H02K 5/12; H02K 5/124; H02K 5/15; H02K 5/17; H02K 5/173; H02K 5/1732;
(Continued)

(56) References Cited

U.S. PATENT DOCUMENTS 3,774,982 A * 11/1973 Nakamura ............... F16C 33/80
                                                              384/480
5,001,581 A *  3/1991 Elsasser ............... G11B 17/038
                                                              360/99.08
(Continued)

FOREIGN PATENT DOCUMENTS

CN       101178095 A      5/2008
CN       101728894 A      6/2010
(Continued)

OTHER PUBLICATIONS

Schaeffler Gruppe Industrie, "FAG—Stromisolierende Lager," Mar. 2011, Germany, 22 pages. (See NPL 2, English Language Version of this Document).
(Continued)

*Primary Examiner* — Tran Nguyen
(74) *Attorney, Agent, or Firm* — McCoy Russell LLP

(57) ABSTRACT

The present invention relates to electrical machines having a shaft rotatably supported in a housing and having a labyrinth seal with labyrinth contours engaging into one another for sealing the housing with respect to the shaft. The invention in this respect in particular relates to the labyrinth seal for sealing the housing of a three-phase machine with respect to a shaft rotatable relative to the housing. In accordance with the invention, at least one side of the labyrinth seal is at least provided with an insulating coating in the region of the labyrinth contours.

13 Claims, 1 Drawing Sheet

(51) Int. Cl.
*H02K 5/15* (2006.01)
*H02K 5/173* (2006.01)
*F16C 33/80* (2006.01)
*F16C 19/06* (2006.01)
*F16C 33/30* (2006.01)
*F16C 33/32* (2006.01)
*F16C 33/62* (2006.01)
*F16J 15/453* (2006.01)

(52) U.S. Cl.
CPC .............. *F16C 33/62* (2013.01); *F16C 33/80* (2013.01); *F16J 15/4476* (2013.01); *F16J 15/453* (2013.01); *H02K 5/15* (2013.01); *H02K 5/1732* (2013.01); *F16C 2204/60* (2013.01); *F16C 2206/40* (2013.01); *F16C 2380/26* (2013.01)

(58) Field of Classification Search
CPC ......... F16B 37/04; F16B 37/041; F16J 15/16; F16J 15/164; F16J 15/32; F16J 15/40; F16J 15/406; F16J 15/44; F16J 15/441; F16J 15/447; F16J 15/4476; F16C 33/80; F16C 35/06; F16C 35/062; F16C 39/02; F03D 80/70; B25B 23/08; B25B 27/20; B25B 31/00
See application file for complete search history.

(56) References Cited

U.S. PATENT DOCUMENTS

| | | | |
|---|---|---|---|
| 5,139,425 A | * | 8/1992 | Daviet .................. F16C 19/184 277/402 |
| 5,383,549 A | * | 1/1995 | Mayer .................... B65G 39/09 198/842 |
| 5,925,955 A | | 7/1999 | Norris |
| 2003/0201609 A1 | | 10/2003 | Hood et al. |
| 2010/0181730 A1 | | 7/2010 | Roddis |
| 2010/0194052 A1 | | 8/2010 | Orlowski et al. |

FOREIGN PATENT DOCUMENTS

| | | |
|---|---|---|
| CN | 202737637 U | 2/2013 |
| CN | 203023297 U | 6/2013 |
| DE | 3511755 A1 | 10/1985 |
| DE | 19742622 A1 | 4/1999 |
| DE | 19804208 A1 | 8/1999 |
| DE | 202012000841 U1 | 2/2012 |
| DE | 202012103429 U1 | 9/2012 |
| EP | 0917274 A1 | 5/1999 |
| EP | 1774188 B1 | 12/2010 |
| EP | 2610514 A1 | 7/2013 |
| WO | 2007034305 A1 | 3/2007 |
| WO | 2013110581 A2 | 8/2013 |

OTHER PUBLICATIONS

Schaeffler Group Industrial, "FAG—Current-Insulating Bearings," Apr. 2011, Germany, 22 pages.

ISA European Patent Office, International Search Report Issued in Application No. PCT/EP2014/002807, dated Sep. 10, 2015, WIPO, 6 pages.

State Intellectual Property Office of the People's Republic of China, Office Action and Search Report Issued in Application No. 201480058220.8, dated Sep. 5, 2017, 15 pages. (Submitted with Partial Translation).

* cited by examiner

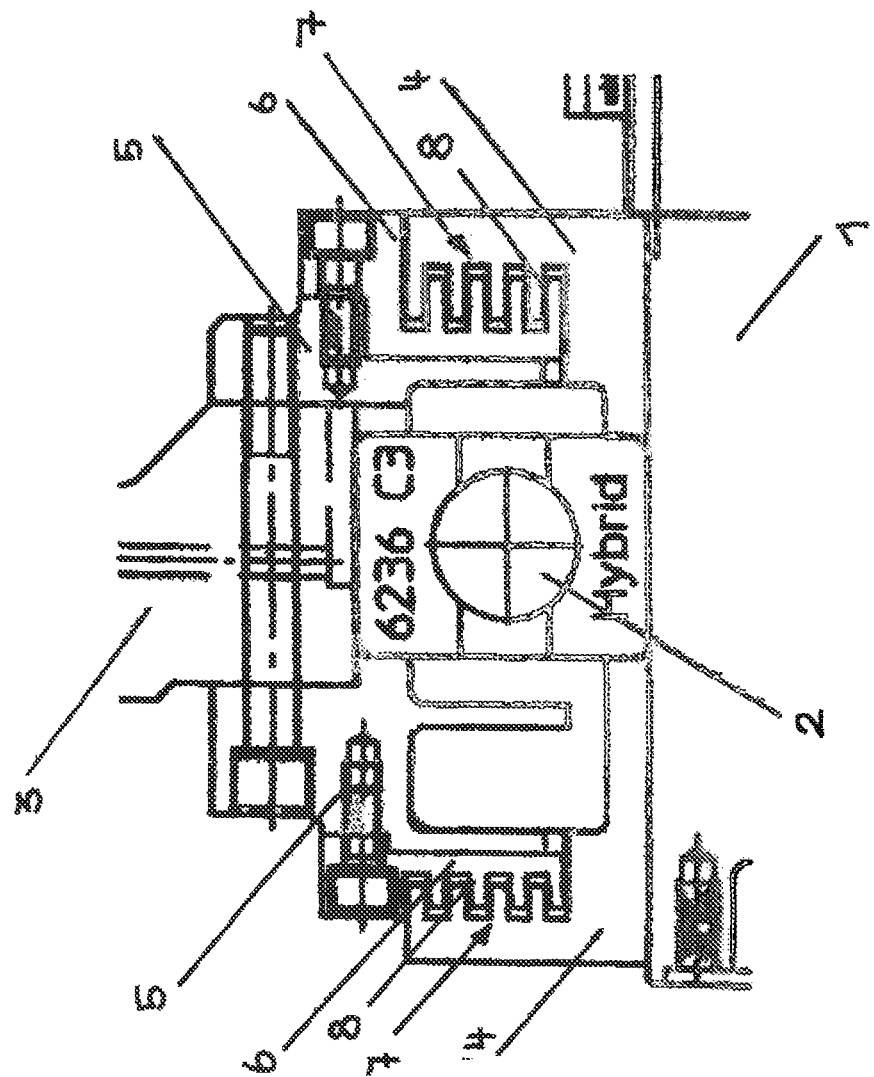

LABYRINTH SEAL FOR THREE-PHASE MACHINES

CROSS REFERENCE TO RELATED APPLICATIONS

The present application is a U.S. National Phase of International Patent Application Serial No. PCT/EP2014/002807, entitled "Labyrinth Seal for Three-Phase Machines," filed on Oct. 17, 2014, which claims priority to German Utility Model Patent Application No. 20 2013 009 385.4, filed on Oct. 22, 2013, the entire contents of each of which are hereby incorporated by reference in their entirety for all purposes.

TECHNICAL FIELD

The present invention relates to electrical machines having a shaft rotatably supported in a housing and having a labyrinth seal with labyrinth contours engaging into one another for sealing the housing with respect to the shaft. The invention in this respect in particular relates to the labyrinth seal for sealing the housing of a three-phase machine with respect to a shaft rotatable relative to the housing.

BACKGROUND AND SUMMARY

It is a known problem with three-phase machines such as synchronous generators, asynchronous generators and the like that shaft voltages or bearing currents are formed, wherein such shaft currents or shaft voltages can have different causes such as electrostatic charges of the generator shaft, external electrical fields which capacitively couple shaft voltages or shaft currents into the generator shaft or magnetic asymmetries of the shaft environment. The formation of uncontrolled current circuits can in this respect result in damage to components included in this current circuit due to current effect and spark erosion.

Different measures have already been proposed to counter this problem. For example, with insulated bearings, in particular with large machines and high frequencies, the desired effect cannot always be achieved due to the relatively thin insulation layer on the ring of the bearing whose thickness typically lies in the micrometer range since capacitive currents can bridge the bearing insulation due to the capacitor effect.

Insulated bearing shields or insulated bearing seats are frequently used in synchronous machines, wherein a galvanic separation of the outer bearing ring takes place with respect to the housing by a specific arrangement of insulated parts such as screws, sleeves and the like, with the shaft here typically being sealed at both sides by a slide seal ring.

Hybrid bearings in which the races are produced from steel and the roller bodies are produced from ceramics can represent a remedy. The spacing between the races is in particular relatively large on a use of balls as roller bodies so that a good insulation can be achieved, with in this case the shaft typically being able to be sealed by labyrinth seals.

Further measures for reducing or suppressing wave currents are known from documents DE 35 11 755 A1 or DE 197 42 622 A1.

With contaminated environmental conditions, the previously used measures are, however, sometimes not sufficient. Current-conducting bridges can in particular occur in the region of the shaft seals in connection with electrically conductive dust or also under unfavorable production tolerances.

It is the underlying object of the present invention to provide an improved electric machine and an improved labyrinth seal of the initially named kind which avoid the disadvantages of the prior art and further develop the latter in an advantageous manner. Wave currents should in particular also be securely suppressed in contaminated environmental conditions in the region of the shaft seal at three-phase machines, in particular synchronous generators, whose shaft is galvanically separated with respect to the housing by insulated bearings, without creating complicated structures for this purpose.

In accordance with the invention, the named object is achieved by an electric machine having a shaft rotatably supported in a housing and having a labyrinth seal with labyrinth contours which engage into one another for sealing the housing with respect to the shaft, wherein at least one side of the labyrinth seal is at least provided with an insulating coating in a region of the labyrinth contour, and by a labyrinth seal for sealing a housing of a three-phase machine with respect to a shaft rotatable with respect to the housing having at least two seal parts which have labyrinth contours which engage into one another, wherein at least one side of the labyrinth seal is at least provided with an insulating layer in a region of the labyrinth contours.

It is therefore proposed to make electrically conductive bridges, which can in particular occur in the region of the labyrinth contours, harmless by an insulation of the labyrinth seal such that such electrically conductive bridges are admittedly still formed, for example by conductive dust, but can no longer transmit any current or, more precisely, can no longer be supplied with current and can no longer discharge any current. In accordance with the invention, at least one side of the labyrinth seal is at least provided with an insulating coating in the region of the labyrinth contours. If an electrically conductive bridge is formed in the region of the labyrinth contours by contamination, current can nevertheless not be transmitted from one labyrinth seal part to the other labyrinth seal part.

In an advantageous further development of the invention, both sides of the labyrinth seal can at least be provided with such an insulating coating in the region of the labyrinth contours. The named insulating coating can in this respect advantageously not only be applied in the region of the labyrinth contours, but can be provided over the total surface of at least the mutually facing sides of the labyrinth seal parts.

Such an insulating coating can be produced from a suitable plastic with which the labyrinth seal parts can be coated.

In a further development of the invention, at least one of the labyrinth seal parts, which has one of the named labyrinth contours, can in this respect also be produced completely from an insulating material, in particular from plastic, so that not only the surface of the labyrinth seal part has an insulating coating, but the labyrinth seal part is rather also formed as insulating in cross-section or the solid material is formed as insulating. The desired insulating effect can be maintained over a longer period by such a formation of the labyrinth seal part completely comprising insulating material even though wear occurs at the surface of the labyrinth seal, for example by contamination.

In a further development of the invention, both labyrinth seal halves can each be produced from an insulating material, in particular plastic.

The shaft to be sealed with respect to the housing by the named labyrinth seal can be rotatably supported at the named housing by at least one hybrid rolling bearing whose roller bodies comprise a different material than its races. The races can in particular be produced from steel and the roller bodies, for example balls, from ceramics. The propagation of shaft currents can also be suppressed in the region of the shaft support by the use of such a hybrid rolling bearing.

In an advantageous further development of the invention, a respective labyrinth seal having an insulating coating and/or composed of insulating material can be provided at both sides of the named hybrid bearing.

The named labyrinth seal can be used in an advantageous manner with different three-phase machines whose shaft is galvanically separated with respect to the housing by insulated bearings. The use of the named labyrinth seal can in particular be of advantage with synchronous generators.

The invention will be explained in more detail in the following with reference to a preferred embodiment and to associated FIGS.

BRIEF DESCRIPTION OF FIGURES

FIG. 1 shows a sectional representation of the support of a shaft of a three-phase machine with respect to a housing part of the three-phase machine, wherein a rolling bearing supporting the shaft rotatably at the housing is encompassed by labyrinth seals at both sides.

DETAILED DESCRIPTION

As FIG. 1 shows, the shaft 1 of the three-phase machine, for example a synchronous generator or an asynchronous motor, can be rotatably supported at a housing part 3 of the three-phase machine by a rolling bearing 2, for example in the form of a ball bearing. The named rolling bearing 2 can advantageously be configured as a hybrid bearing whose roller bodies comprise a different material than the races of the rolling bearing, wherein the named roller bodies can advantageously be formed from an electrically non-conductive material, in particular ceramics. The races can in this respect be produced from steel in a manner known per se.

To seal the housing 3 with respect to the rotating shaft 1, a respective labyrinth seal 7 can be provided at both sides of the named rolling bearing 2, which labyrinth seal respectively comprises a rotating labyrinth seal part 4, which is fastened on the shaft 1, and a non-rotating labyrinth seal part 5 which is fastened to the housing part 3. The rotating labyrinth seal part 4 can in this respect be seated on a circumferential surface of the shaft 1, whereas the non-rotating labyrinth seal part 5 can be fastened, for example screwed, to the housing part 3 at the front side.

The two labyrinth seal parts 4 and 5 each comprise labyrinth contours 8 which engage into one another and which define a labyrinth-shaped gap between them. For example, the named labyrinth contours 8 can comprise ring-shaped groove profiles and web profiles which engage into one another like a comb.

As FIG. 1 shows, at least one of the labyrinth seal parts 4 and 5—for example, the non-rotating labyrinth seal part 5—can be provided with an insulating layer 6 which is at least provided in the region of the labyrinth contour 8 and/or which forms the named labyrinth contour 8. The named insulating layer 6 can be formed, for example, in the form of a ring-shaped disk onto which the side of the respective labyrinth seal part 5 facing the other labyrinth seal part 4 can be placed, for example screwed tight.

Alternatively to the embodiment shown in FIG. 1, the respective labyrinth seal part—or also each of the two labyrinth seal parts 4 and 5—could be completely produced from insulating material, for example plastic.

The invention claimed is:

1. An electric machine having a shaft rotatably supported in a housing and having a labyrinth seal with labyrinth contours which engage into one another for sealing the housing with respect to the shaft, wherein at least one side of the labyrinth seal is at least provided with an insulating coating in a region of the labyrinth contours, wherein the shaft is supported at the housing by at least one hybrid roller bearing comprising roller bodies and races, the roller bodies formed from a material different than a material of the races, and wherein the roller bodies are formed from an electrically non-conductive material, the labyrinth seal having an insulating coating provided at both sides of said hybrid roller bearing.

2. The electric machine in accordance with claim 1, wherein both mutually oppositely disposed sides of the labyrinth seal are at least provided with one insulating coating in the region of the labyrinth contours.

3. The electric machine in accordance with claim 1, wherein at least one of two labyrinth seal parts has one of the labyrinth contours completely produced from insulating material.

4. The electric machine in accordance with claim 1, wherein the hybrid roller bearing has ceramic roller bodies and steel races.

5. The electric machine in accordance with claim 1, wherein it is configured as a three-phase machine whose shaft is galvanically separated with respect to the housing by insulated bearings.

6. A labyrinth seal for sealing a housing of a three-phase machine with respect to a shaft rotatable with respect to the housing having at least two seal parts which have labyrinth contours which engage into one another, wherein at least one side of the labyrinth seal is at least provided with an insulating layer in a region of the labyrinth contours in a form of a ring-shaped disk,
   wherein the shaft is supported at the housing by at least one hybrid roller bearing comprising roller bodies and races, the roller bodies formed from a material different than a material of the races, and
   wherein the roller bodies are formed from an electrically non-conductive material, the insulating layer of the labyrinth seal provided at both sides of said hybrid roller bearing.

7. The labyrinth seal in accordance with claim 6, wherein both sides of the labyrinth seal are provided with a respective insulating coating.

8. The labyrinth seal in accordance with claim 6, wherein at least one of the labyrinth seal parts which has one of the labyrinth contours is completely produced from insulating material.

9. The electric machine in accordance with claim 3, wherein the insulating material is plastic.

10. The electric machine in accordance with claim 4, wherein the ceramic roller bodies are roller balls.

11. The electric machine in accordance with claim 5, wherein the three-phase machine is a synchronous generator.

12. The labyrinth seal in accordance with claim 8, wherein the insulating material is plastic.

13. A system, comprising:
   an electric machine having a shaft rotatably supported in a housing and having a labyrinth seal with labyrinth contours which engage into one another for sealing the housing with respect to the shaft, wherein at least one side of the labyrinth seal is an insulating layer in a form of a ring-shaped disk at the labyrinth contours, the insulating layer forming an external surface of the electric machine, wherein the shaft is supported at the housing by at least one hybrid roller bearing comprising roller bodies and races, the roller bodies formed from a material different than a material of the races, wherein the roller bodies are formed from an electrically non-conductive material, the insulating layer of the labyrinth seal provided at both sides of said hybrid roller bearing.

\* \* \* \* \*